United States Patent [19]

Kelly

[11] 4,162,390
[45] Jul. 24, 1979

[54] LASER WELDING CHAMBER

[75] Inventor: Thomas J. Kelly, Suffern, N.Y.

[73] Assignee: The International Nickel Company, Inc., New York, N.Y.

[21] Appl. No.: 839,027

[22] Filed: Oct. 3, 1977

[51] Int. Cl.² .............................................. B23K 9/00
[52] U.S. Cl. .............................................. 219/121 LM
[58] Field of Search ..... 219/121 L, 121 LM, 121 EB, 219/121 EM, 72

[56] References Cited

U.S. PATENT DOCUMENTS

| | | | |
|---|---|---|---|
| 2,987,610 | 6/1961 | Steigerwald | 219/121 EB |
| 3,626,141 | 12/1971 | Daly | 219/121 L |
| 3,824,368 | 7/1974 | Lake | 219/121 LM |
| 3,866,398 | 2/1975 | Vernon, Jr. et al. | 219/121 L X |
| 3,965,328 | 6/1976 | Locke | 219/121 LM |
| 3,992,161 | 11/1976 | Cairns et al. | 29/182.5 |
| 4,000,392 | 12/1976 | Banas et al. | 219/121 LM |
| 4,027,137 | 5/1977 | Liedtke | 219/121 L |

Primary Examiner—J. V. Truhe
Assistant Examiner—Fred E. Bell
Attorney, Agent, or Firm—Ewan C. MacQueen; Walter A. Petersen; Miriam W. Leff

[57] ABSTRACT

Apparatus and method for laser welding in a controllably pure gaseous environment at sub-atmospheric as well as high pressures. A workpiece to be welded is contained within a vessel having a light transmitting means which allows passage of a laser beam into the vessel. A gas stream is introduced to the vessel through a gas inlet means and positioned so that the stream deflects ionized particles from impinging on the light transmitting means. The gas stream simultaneously serves to cool the light transmitting means. Weld debris and spent gas are exhausted through a gas exhaust means which preferably is located adjacent to the workpiece. The apparatus is particularly suited to the laser welding of oxide dispersion strengthened alloys.

12 Claims, 1 Drawing Figure

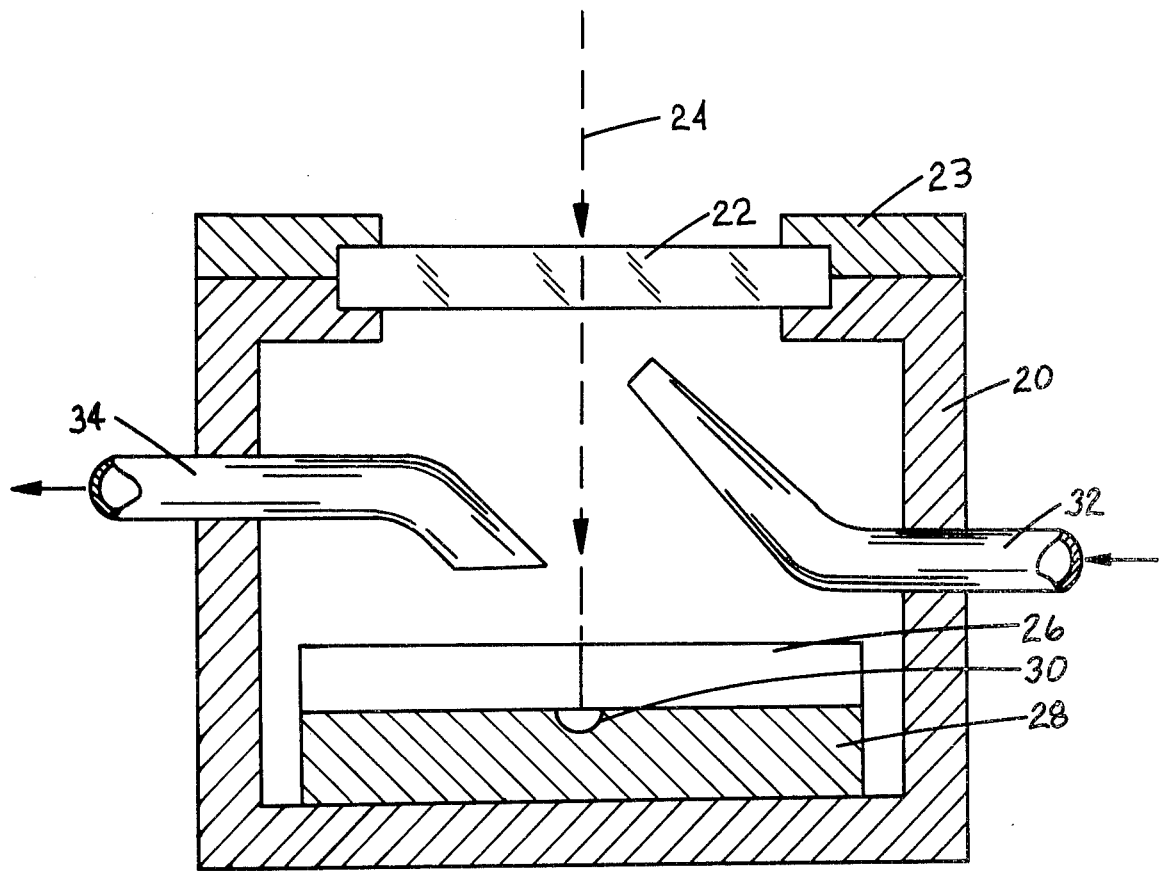

LASER WELDING CHAMBER

BACKGROUND OF THE INVENTION

This invention is concerned with an apparatus for laser welding of metals in a pressurized atmosphere.

Oxide Dispersion Strengthened (ODS) alloys, such as those described in U.S. Pat. No. 3,992,161, are generally produced by powder metallurgy techniques. The powdered metals used for mechanically alloyed ODS alloys, as well as a number of other alloys, can be prepared by atomizing a molten metal stream with high velocity jets of argon gas. Some of the argon used for atomization, as well as argon which may be incorporated during a mechanical alloying operation performed in an argon atmosphere, can be entrapped in the powdered metal and retained, albeit in small quantities, in consolidated and sintered shapes prepared from the ODS alloys. Attempts to join ODS alloys by welding have been hampered by gross porosity resulting from entrapped argon.

An additional welding problem resides in the agglomeration and slagging-off of the dispersoid without which the ODS alloy weld deposits are severely limited in elevated temperature strength. Attempts to weld the ODS alloys with a variety of well known fusion welding techniques have generally been unsuccessful in overcoming the dispersoid agglomeration problem.

The advent of LASER (Light Amplification by Stimulated Emission of Radiation) devices useful for welding provides an advantageous tool for attacking the problems inherent in joining ODS alloys. Because a laser beam provides an intense source of radiation in a small area, rapid melting occurs and under appropriate conditions can be followed by rapid solidification so that the dispersoid will have insufficient time to agglomerate and/or slagg off (e.g., melting and solidification during laser welding can occur in 8 milliseconds). Thus, under appropriate welding conditions, it is theoretically possible for the dispersoid to be retained within the weld deposit and to provide the desired strengthening effect during elevated temperature service. However, the problem of argon induced porosity is not avoided by using known laser welding techniques, similar to those described in U.S. Pat. Nos. 3,824,368 and 4,000,392, where inert gas substantially at atmospheric pressure and subject to ingestion of air is used to shield the workpiece.

Porosity, for example, of the type attributed to the presence of argon in ODS alloys, can be largely suppressed by welding in a pressurized atmosphere containing gas of essentially the same composition as that responsible for the porosity, e.g., argon. However, attempts to use a laser beam for welding in a pressurized chamber containing such an argon atmosphere have been thwarted by ionization of the still argon and the formation of a soot-like buildup in the welding chamber which absorb laser power and interrupt welding continuity. In addition, a stream of what is believed to be ionized metal particles travels along the laser beam, impinging on the inside surface of the light transmitting means (sight glass necessary for transmission of the laser beam into the chamber). This action causes absorption of laser energy as well as severe thermal stress and rapid breakage or even melting of the light transmitting means.

The latter problem appears, in many respects, to be unique to laser welding within a chamber, although laserinduced debris problems have been described in several patents dealing with laser cutting and drilling as represented by U.S. Pat. Nos. 3,626,141, 3,866,398 and 4,027,137.

SUMMARY OF THE INVENTION

It has now been discovered that sound laser welds can be prepared in workpieces enclosed within a gas tight vessel by introducing a stream of an appropriate gas into the vessel and directing this gas stream to impinge the surface of a light transmitting means while intersecting the laser beam. The gas stream deflects ionized particles moving countercurrent to the laser beam so that the particles substantially avoid contact with the light transmitting means. In addition, the gas stream cools the light transmitting means. Simultaneously to gas inflow, spent gas is withdrawn to clear the vessel of soot and welding debris. The combined actions of the inflowing gas stream and the exhaust provide improved laser beam efficiency and substantially avoid clouding and breakage or melting of the light transmitting means thereby allowing laser welding within a pressurized environment, particularly of ODS alloys under conditions which substantially avoid porosity. In addition, the apparatus and method of the present invention are generally useful for the laser welding of metals where it is essential that laser welding be performed in a specific gas atmosphere at high as well as sub-atmospheric pressures. The apparatus provides a controllably pure gaseous environment for welding wherein both sides of the weld bead and the surrounding metal are protected. According to the present invention, contamination by specific gaseous ingredients also can be avoided (e.g., oxides and nitrides) and conditions for favorable gas-metal reactions provided (e.g., carbides and nitrides) if desired.

Generally speaking, the present invention is an apparatus for welding with a laser beam comprising: a gas tight vessel enclosing a workpiece to be welded; a light transmitting means for passage of the laser beam into the vessel, the light transmitting means positioned to permit impingement of the laser beam on the workpiece; a gas inlet means for introducing a gas stream into the vessel, the gas inlet means positioned to impinge the gas stream on the light transmitting means and intersect the laser beam; and a gas exhaust means for the removal of gas from the vessel. Preferably, the gas exhaust means is located adjacent to the workpiece. With the preferred arrangement, fumes from the welding operation are extracted from the vessel to provide minimal interference with the laser beam and to maintain cleanliness within the vessel.

BRIEF DESCRIPTION OF THE DRAWING

The FIGURE is a schematic cross section of a preferred embodiment of the apparatus of the present invention.

DESCRIPTION OF THE PREFERRED EMBODIMENT

Referring now to the figure, the gas tight vessel 20 is provided with a light transmitting member 22 (preferably located opposite and aligned with the workpiece) prepared from a suitable material (e.g., a borosilicate glass, a methyl methacrylate plastic, germanium, etc.) that is transparent to light having a wave length less than about 11 microns and preferably less than about 2 microns. An appropriate sealing means 23 is used to seal the light transmitting means to the gas tight vessel (e.g., by bolting a metal ring to compress a rubber O-ring between the vessel and the light transmitting means). The laser beam 24 passes through the light transmitting means and a suitable gas within the vessel (e.g., an inert gas such as argon, helium, etc.) to intersect the workpiece 26 contained within the gas tight vessel. The workpiece represents the metal being welded and in the simple configuration shown is representative of a square butt joint between two rectangular pieces of sheet metal. The pieces of metal being joined are generally held down by a clamping means (not shown) to maintain alignment and to limit distortion during welding.

The workpiece is depicted atop a backing plate 28 having a groove 30. The backing plate is generally prepared from copper, or it can be prepared from other metals such as silver or aluminum that provide high reflective properties to the laser beam as well as excellent heat conducting properties. The backing plate serves to protect the region of the gas tight vessel directly in line with the laser beam and also directs weld solidification from the bottom toward the top surface of the workpiece. The groove 30 in the backing plate allows penetration by the laser beam and flow of molten metal at the base of the joint.

A gas inlet means 32 is positioned through a wall of the gas tight vessel adjacent to the light transmitting means. An inert gas introduced through the gas inlet means, in addition to the function of substantially avoiding ionization of the gas stream, strikes the light transmitting means in the region through which the laser beam is transmitted and serves to remove heat from the light transmitting means such as that from the welding process and heat generated by interaction of the laser and the light transmitting means or any metal vapor deposited on the surface of the light transmitting means. The gas flow is also directed to intersect the path of the laser beam. Metal vapors ionized by the laser beam traveling toward the laser beam source are deflected by the stream of inert gas. Deflection of the ionized particles substantially avoids deposition of the particles on the light transmitting means with consequent clouding of this means. Such clouding will cause a substantial decrease in the efficiency with which the laser beam is transmitted. Also, because of the buildup of a metal layer on the surface of the light transmitting means, heat is generated within this means due to interaction with the laser beam. Such heating results in melting of transparent plastics and high thermal stresses which can lead to breakage of glass members with resultant weld stoppage. As will be recognized by those skilled in the art, the effectiveness of the gas stream is dependent on not only the degree of turbulence provided but on the physical properties of the gas used, as well as the positioning and shape of the gas inlet means and vessel. Gas flow rates as low as about 0.3 m$^3$/hr. are useful with argon.

A gas exhaust means 34 is provided to allow the inert gas, along with metal vapor and debris formed during welding, to be exhausted from the gas tight vessel. It is preferred to position the gas exhaust means in the immediate vicinity of the workpiece so that fumes generated during the welding operation are removed from the gas tight vessel by the shortest route. That is, the ionized particles that travel along the laser beam toward the light transmitting member represent only a portion of the fumes generated during the welding operation. Since these fumes as well as nonionized fumes would reside in the chamber if not exhausted in the vicinity of the welding operation, they would serve as a filter and act to reduce the efficiency of the laser beam. The gas exhaust means can be any convenient means for providing lower pressure outside the gas tight vessel (e.g., regulator, bubbler, partial vacuum, controlled leak, etc.). It is most preferred to have the shape of the gas exhaust means conform to a particular weld configuration so that it is aligned with and runs the length of the weld. Such a paradromic arrangement most effectively removes fumes during the welding operation.

In the general case of preparing a weld bead requiring relative motion between the workpiece and the laser beam, the chamber can be moved and a stationary laser beam used. Alternatively, the chamber can be maintained stationary and the laser beam moved to prepare the weld.

To illustrate the process of this invention, two pieces of an ODS sheet alloy were joined by laser welding in argon under a pressure of about 50 N/mm$^2$. The ODS alloy known as MA956E and available from Huntington Alloys, Inc. nominally contained, in weight percent: 20% Cr, 4% Al, 0.5% Ti, 0.5% Y$_2$O$_3$, Bal. Fe. Representative pieces of this alloy, 1 mm thick by 38 mm wide by 100 mm long, were butted together along a 38 mm edge. The pieces were clamped to a copper backing plate within a 850 cm$^3$ vessel representative of a preferred embodiment of the present invention. The vessel was sealed by tightening 8 screws to compress a rubber O-ring placed between a clear methyl methacrylate light transmitting means and the vessel. Argon was introduced to the vessel at a pressure of about 0.50 N/mm$^2$ at an estimated flow rate of 0.6 M$^3$/hr and exhausted through the gas exhaust means at a rate sufficient to maintain the internal argon gas pressure.

A Sylvania 1610 laser having a neodymium doped Yttrium Aluminum Garnet providing light of 1.06 micron wave length was used to prepare the welded joint. The laser device was operated at an energy input of 16 joules/pulse using 10 pulses per second. The vessel containing the pieces to be welded was moved past the stationary laser beam at a travel speed of 7.5 cm/min. The angle of the beam was 85° to the horizontal surface of the workpiece. Continuous welding was achieved under the foregoing conditions and a sound, 38 mm long, weld obtained. By way of contrast, when the chamber was operated at 0.50 N/mm$^2$ internal pressure with the gas exhaust means closed so that there was no flow of gas from the gas inlet means to intersect the laser beam and to strike the light transmitting means, the welding operation effectively ceased after traveling about 1 mm due to fumes within the chamber and clouding of the light transmitting means. As a result of two attempts to weld under these conditions with the production of about a 2 mm length of weld, the plastic light transmitting means exhibited partial melting and was not useful for further trials.

The apparatus of the present invention is generally suited to welding with laser beams having wave lengths of less than about 11 microns. Any solid light transmitting means can be used as long as it is transparent to the incident laser radiation. To illustrate, the CO$_2$ laser, which emits coherent light radiation in the far infrared region having a wavelength of 10.6 microns, can be used when the vessel is fitted with a light transmitting means transparent to such light (e.g., zinc selenide, germanium, a barium fluoride, tellurium, etc., sight glasses).

A laser having a wave length less than about 2 microns, such as a pulsed Nd YAG laser of 1.06 micron wave length, is preferred since it can be transmitted through more common transparent materials (e.g., glasses and plastics).

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. An apparatus for welding with a laser beam comprising:
   a. a gas tight vessel enclosing a workpiece to be welded;
   b. a light transmitting means for passage of said laser beam into said vessel, said light transmitting means positioned to permit impingement of said laser beam on said workpiece;
   c. a gas inlet means for introducing a gas stream into said vessel, said gas inlet means positioned to impinge said gas stream on said light transmitting means and intersect said laser beam; and
   d. a gas exhaust means for the removal of gas from said vessel.

2. An apparatus as defined in claim 1, wherein said light transmitting means is positioned opposite and aligned with said workpiece.

3. An apparatus as defined in claim 2, wherein said gas exhaust means is positioned adjacent said workpiece.

4. An apparatus as defined in claim 3, wherein said gas exhaust means is shaped paradromic with a weld centerline in said workpiece.

5. A process for welding comprising:
   a. inserting a workpiece to be welded within a gas tight vessel having a light transmitting means for passage of a laser beam into said vessel, said light transmitting means positioned to permit impingement of said laser beam on said workpiece, said vessel having a gas inlet means for introduction of a gas stream positioned to impinge said gas stream on said light transmitting means and intersecting said laser beam, and a gas exhaust means for removal of gas from said vessel;
   b. flowing said gas stream through said vessel; and
   c. directing a laser beam to impinge said workpiece along a predetermined course to provide a weld.

6. A process as defined in claim 5, wherein said light transmitting means is positioned opposite and aligned with said workpiece.

7. A process as defined in claim 6, wherein said gas exhaust means is positioned adjacent said workpiece.

8. A process as defined in claim 7, wherein said gas stream is introduced to said vessel at a flow rate sufficient to substantially avoid ionization of said gas stream and to deflect an ionized metal particle stream transmitted along said laser beam while cooling said light transmitting means.

9. A process as defined in claim 8, wherein said gas stream is an inert gas stream.

10. A process as defined in claim 8, wherein said gas stream is an argon stream.

11. An apparatus for welding at pressured atmospheres with a laser beam comprising:
    (a) a gas tight vessel enclosing a workpiece to be welded;
    (b) a light transmitting means for passage of said laser beam into said vessel, said light transmitting means positioned to permit impingement of said laser beam on said workpiece;
    (c) a pressure regulating means for controlling gas pressure in the gas tight vessel at a positive pressure;
    (d) a gas inlet means for introducing a gas stream into said vessel, said gas inlet means positioned to impinge said gas stream on said light transmitting means and intersect said laser beam; and
    (e) a gas exhaust means for the removal of gas from said vessel.

12. A process for welding at pressured atmospheres comprising:
    (a) inserting a workpiece to be welded within a gas tight vessel having a light transmitting means for passage of a laser beam into said vessel, said light transmitting means positioned to permit impingement of said laser beam on said workpiece, said vessel having a gas inlet means for introduction of a gas stream positioned to impinge said gas stream on said light transmitting means and intersecting said laser beam, and a gas exhaust means for removal of gas from said vessel;
    (b) flowing said gas stream through said vessel and maintaining said gas in the vessel at a positive pressure;
    (c) directing a laser beam to impinge said workpiece along a predetermined course to provide a weld, and
    (d) exhausting gas at a pressure lower than the pressure of said gas in the gas tight vessel.

* * * * *